United States Patent
Yang et al.

(10) Patent No.: US 9,439,193 B2
(45) Date of Patent: Sep. 6, 2016

(54) DYNAMIC ASSIGNMENT OF UNLICENSED BANDS FOR DATA FLOW TRANSMISSION

(71) Applicant: Verizon Patent and Licensing Inc., Arlington, VA (US)

(72) Inventors: Jin Yang, Orinda, CA (US); Yee Sin Chan, San Jose, CA (US); Zheng Zhao, Plainsboro, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/206,979

(22) Filed: Mar. 12, 2014

(65) Prior Publication Data
US 2015/0264702 A1    Sep. 17, 2015

(51) Int. Cl.
*H04W 72/00* (2009.01)
*H04W 72/04* (2009.01)
*H04W 72/08* (2009.01)

(52) U.S. Cl.
CPC ....... *H04W 72/0453* (2013.01); *H04W 72/082* (2013.01)

(58) Field of Classification Search
CPC .. H04W 72/085; H04W 72/10; H04W 16/14
USPC ....................................... 455/452.1
See application file for complete search history.

(56) References Cited

U.S. PATENT DOCUMENTS

| | | | |
|---|---|---|---|
| 2006/0281404 A1* | 12/2006 | Lee | H04B 7/2606 455/11.1 |
| 2007/0054622 A1* | 3/2007 | Berkman | 455/67.11 |
| 2011/0080935 A1* | 4/2011 | Kim et al. | 375/133 |
| 2013/0337821 A1* | 12/2013 | Clegg | 455/452.1 |

* cited by examiner

*Primary Examiner* — Thomas Lett

(57) ABSTRACT

A network device may determine a sequence. The sequence may identify an order in which particular unlicensed bands, of a plurality of unlicensed bands in an unlicensed spectrum, are to be assigned for the transmission of data flows. The network device may provide information identifying the sequence via a licensed band to a user device to cause the user device to transmit or receive the data flows via the particular unlicensed bands identified in the sequence in the order in which the particular unlicensed bands are to be assigned; and transmit or receive, to or from the user device, the data flows via the particular unlicensed and the licensed bands.

20 Claims, 10 Drawing Sheets

DYNAMIC ASSIGNMENT OF UNLICENSED BANDS FOR DATA FLOW TRANSMISSION

BACKGROUND

User devices may connect to cellular networks to transmit and/or receive data flows. Cellular networks assign the transmission of data flows to particular bands (e.g., frequency ranges) in a spectrum. Cellular networks may operate on a licensed spectrum having a number of licensed bands. As network bandwidth demands increase, the amount of bandwidth provided on the licensed spectrum may be insufficient to support the transmission of data flows.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may utilize unlicensed frequencies in a spectrum to transmit data flows to and/or from a user device in order to increase data rates and/or otherwise increase the performance of data transmissions.

Figure 1:
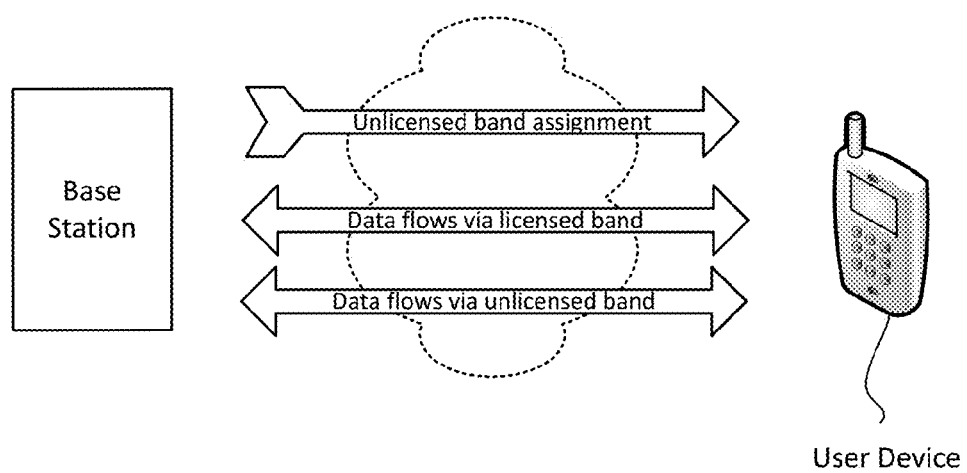
FIG. 1 illustrates an example overview of an implementation described herein.

FIG. 1 illustrates an example overview of an implementation described herein. In FIG. 1, a user device may connect with a base station to access a network, such as a cellular network. When connected to the base station, the user device may transmit and/or receive data flows via a primary component carrier (PCC) associated with a licensed band. As used herein, the term "licensed band" may refer to a predetermined frequency range that is reserved and/or owned by a service provider for data flow transmission. Examples of licensed bands may include, for example, frequency bands commonly used pursuant to wireless networking using cellular networks (e.g., long-term evolution (LTE) network, etc.). As used herein, the term "unlicensed band" may refer to a frequency range that may be utilized for data flow transmission, but may not be predetermined. Examples of unlicensed bands may include, for example, frequency bands commonly used pursuant to wireless networking using Institute of Electrical and Electronics Engineers (IEEE) 802.11-based networking (e.g., WiFi).

As shown in FIG. 1 the base station may provide an unlicensed band assignment to the user device. For example, the base station may provide the unlicensed band assignment via the PCC that is implemented over the licensed band. The unlicensed band assignment may include a sequence of channel identifiers. Each channel identifier may identify a particular unlicensed band via which the user device may transmit and/or receive data flows over a secondary component carrier (SCC). Based on receiving the unlicensed band assignment, the user device may transmit and/or receive the data flows via both the licensed band and the unlicensed bands identified in the unlicensed band assignment. As a result, bandwidth, available to the user device via the PCC, may be supplemented by unlicensed bands associated with the SCC, thereby increasing bandwidth available to the user device and/or a transmission performance (e.g., as measured by data rates, latency, jitter, etc.).

In some implementations, unlicensed bands may be dynamically assigned on a per-packet basis based on the sequence of channel identifiers included in the unlicensed band assignment. That is, packets in a data flow may be transmitted and/or received via different unlicensed bands. In some implementations, the base station may continuously provide updated unlicensed band assignments to dynamically assign unlicensed bands on a per-packet basis.

Figure 2:
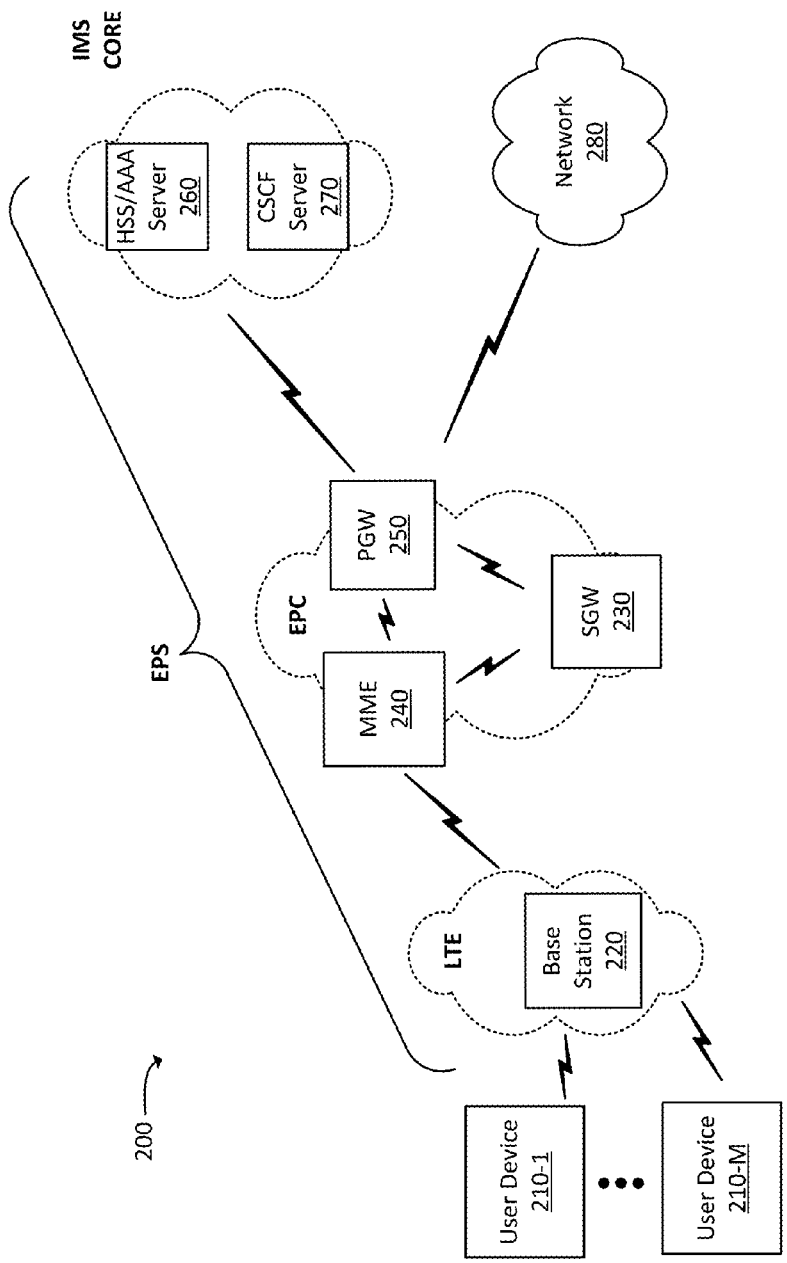
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1 through 210-M (where M is greater than or equal to 1), a base station 220, a serving gateway 230 (referred to as "SGW 230"), a mobility management entity device 240 (referred to as "MME 240"), a packet data network (PDN) gateway (PGW) 250 (referred to as "PGW 250"), a home subscriber server (HSS)/authentication, authorization, accounting (AAA) server 260 (referred to as an "HSS/AAA server 260"), a call service control function (CSCF) server 270 (referred to as "CSCF server 270"), and a network 280.

Environment 200 may include an evolved packet system (EPS) that includes a long term evolution (LTE) network, an evolved packet core (EPC), and/or an Internet protocol (IP) multimedia subsystem (IMS) core that operate based on a third generation partnership project (3GPP) wireless communication standard. The LTE network may be a radio access network (RAN) that includes one or more base stations, such as eNodeBs (eNBs), via which user device 210 communicates with the EPC. The EPC may include SGW 230, MME 240, and/or PGW 250 and may enable user device 210 to communicate with network 280 and/or the IMS core. The IMS core may include HSS/AAA server 260 and may manage authentication, connection initiation, account information, a user profile, etc. associated with user device 210. As shown in FIG. 2, the LTE network may include base station 220, and the EPC may include SGW 230, MME 240, and/or PGW 250.

User device 210 may include any computation or communication device, such as a wireless mobile communication device that is capable of communicating with base station 220 and/or a network (e.g., network 280). For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of computation or communication device. User device 210 may send data to and/or receive data from network 280.

Base station 220 may include one or more network devices that receive, process, and/or transmit traffic, such as audio, video, text, and/or other data, destined for and/or received from user device 210. In an example implementation, base station 220 may be an eNB device and may be part of the LTE network. Base station 220 may receive traffic from and/or send traffic to network 280 via SGW 230 and PGW 250. Base station 220 may send traffic to and/or MME 240 may perform policing operations for traffic destined for and/or received from user device 210. MME 240 may authenticate user device 210 (e.g., via interaction with HSS/AAA server 260).

PGW 250 may include one or more network devices, such as a gateway, a router, a modem, a switch, a firewall, a NIC, a hub, a bridge, a proxy server, an OADM, or some other type of device that processes and/or transfers traffic. PGW 250 may, for example, provide connectivity of user device 210 to external packet data networks by being a traffic exit/entry point for user device 210. PGW 250 may perform policy enforcement, packet filtering, charging support, lawful intercept, and/or packet screening. PGW 250 may also act as an anchor for mobility between 3GPP and non-3GPP technologies.

HSS/AAA server 260 may include one or more computing devices, such as a server device or a collection of server devices. In some implementations, HSS/AAA server 260 may include a device that gathers, processes, searches, stores, and/or provides information in a manner described herein. For example, HSS/AAA server 260 may manage, update, and/or store, in a memory associated with HSS/AAA server 260, profile information associated with user device 210 that identifies applications and/or services that are permitted for and/or accessible by user device 210, bandwidth or data rate thresholds associated with the applications or services, information associated with a user of user device 210 (e.g., a username, a password, a personal identification number (PIN), etc.), rate information, minutes allowed, and/or other information. Additionally, or alternatively, HSS/AAA server 260 may include a device that performs authentication, authorization, and/or accounting (AAA) operations associated with a communication connection with user device 210. receive traffic from user device 210 via an air interface. One or more of base stations 220 may be associated with a RAN, such as the LTE network.

Base station 220 may store information identifying channels associated with an unlicensed spectrum. Each channel may correspond to a particular unlicensed band in the unlicensed spectrum. For example, a first channel may correspond to a first band having a first frequency range, a second channel may correspond to a second band having a second frequency range, and so on. Base station 220 may dynamically assign unlicensed bands to packets of data flows transmitted to and/or from user device 210. Base station 220 may communicate with user device 210 over a licensed band to provide unlicensed band assignments to user device 210. Base station 220 may simultaneously communicate with user device 210 over a PCC, associated with the licensed band, and over an SCC associated with dynamically assigned unlicensed bands.

SGW 230 may include one or more network devices, such as a gateway, a router, a modem, a switch, a firewall, a network interface card (NIC), a hub, a bridge, a proxy server, an optical add-drop multiplexer (OADM), or some other type of device that processes and/or transfers traffic. SGW 230 may, for example, aggregate traffic received from one or more base stations 220 and may send the aggregated traffic to network 280 via PGW 250. In one example implementation, SGW 230 may route and forward user data packets, may act as a mobility anchor for a user plane during inter-eNB handovers, and may act as an anchor for mobility between LTE and other 3GPP technologies.

MME 240 may include one or more network devices that perform operations associated with a handoff to and/or from the EPS. MME 240 may perform operations to register user device 210 with the EPS, to handoff user device 210 from the EPS to another network, to handoff a user device 210 from the other network to the EPS, and/or to perform other operations.

CSCF server 270 may include one or more computing devices, such as a server device or a collection of server devices. In some implementations, CSCF server 270 may include a device that gathers, processes, searches, stores, and/or provides information in a manner described herein. CSCF server 270 may process and/or route calls to and from user device 210 via the EPC. For example, CSCF server 270 may process calls, received from network 280, that are destined for user device 210. In another example, CSCF server 260 may process calls, received from user device 210, that are destined for network 280.

Network 280 may include one or more wired and/or wireless networks. For example, network 280 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 280 may include a local area network (LAN), a wide area network (WAN), a metropolitan network (MAN), the Public Switched Telephone Network (PSTN), an ad hoc network, a managed Internet Protocol (IP network, a virtual private network (VPN), an intranet, the Internet, a fiber optic-based network, and/or a combination of these or other types of networks.

The quantity of devices and/or networks in environment is not limited to what is shown in FIG. 2. In practice, environment 200 may include additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
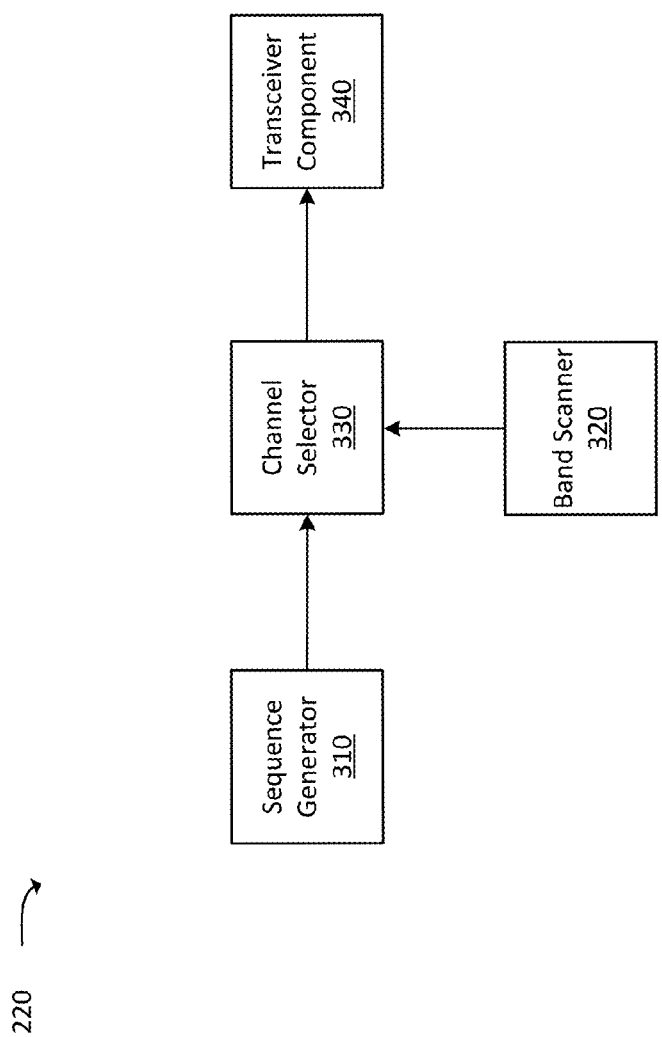
FIG. 3 illustrates example components of a base station.

FIG. 3 illustrates example components of a base station. As shown in FIG. 3, base station 220 may include sequence generator 310, band scanner 320, channel selector 330, and transceiver component 340. Sequence generator 310 may include a sequence generating component, such as a pseudorandom number generator and/or some other type of sequence generator. For example, sequence generator 310 may include a component that may generate a uniformly distributed channel number sequence. Sequence generator 310 may generate a sequence of numbers that each identify a particular channel corresponding to a particular unlicensed band that may be dynamically assigned. Sequence generator 310 may generate a sequence of numbers that are within a range of the number of channels (e.g., the number of unlicensed bands) included in the unlicensed spectrum. In some implementations, sequence generator 310 may periodically provide a sequence of numbers to channel selector 330 in accordance with a band hop schedule.

Band selector 320 may include a spectrum analyzer and/or some other type of device that may measure interference and/or noise present for data transmitted in particular frequency bands. Band selector 320 may provide frequency interference information to channel selector 330. As described in greater detail below, channel selector 330 may exclude particular unlicensed bands from being assigned based on the frequency interference information.

Channel selector 330 may store information identifying unlicensed bands and corresponding channels. Channel selector 330 may receive a sequence of numbers from sequence generator 310 and frequency interference information from band selector 320. Channel selector 330 may identify bands having a measure of frequency interference that exceeds a particular threshold. Channel selector 330 may generate selected channel information including a sequence of channel identifiers, received from sequence generator 310, with the exclusion of those channel identifiers associated with bands having interference exceeding a particular threshold. In some implementations, the selected channel information may exclude channels associated with currently assigned bands. In some implementations, the selected channel information may include information identifying the frequency range of the unlicensed band corresponding to the channel identifiers in the sequence. The sequence of channel identifiers, included in the selected channel information, may correspond to unlicensed bands that are to be dynamically assigned for data flow transmission (e.g., on a per-packet basis). In some implementations, the selected channel information may identify multiple sequences, for example, when multiple unlicensed bands may be used by user device 210 and base station 220 to communicate. Channel selector 330 may provide the selected channel information to transceiver component 340.

Transceiver component 340 may receive the selected channel information, and may provide the selected channel information to user device 210 over the PCC (i.e., via a licensed band). In some implementations, the selected channel information may include control information that is transmitted separately or otherwise distinguished from other data (e.g., substantive user data) that is unrelated to the selected channel information.

User device 210 may transmit and/or receive data flows (e.g., to and/or from transceiver component 340) via unlicensed bands, identified in the selected channel information. In some implementations, transceiver component 340 may transmit and/or receive data flows (e.g., to and/or from user device 210) via the unlicensed bands, identified in the selected channel information. As a result, user device 210 and base station 220 may communicate via an aggregation of the licensed and unlicensed bands. While sequence generator 310, band selector 320 and channel selector 330 are described as being part of base station 220, in practice, sequence generator 310, and band selector 320, and/or channel selector 330 may be implemented external to base station 220.

Figure 4:
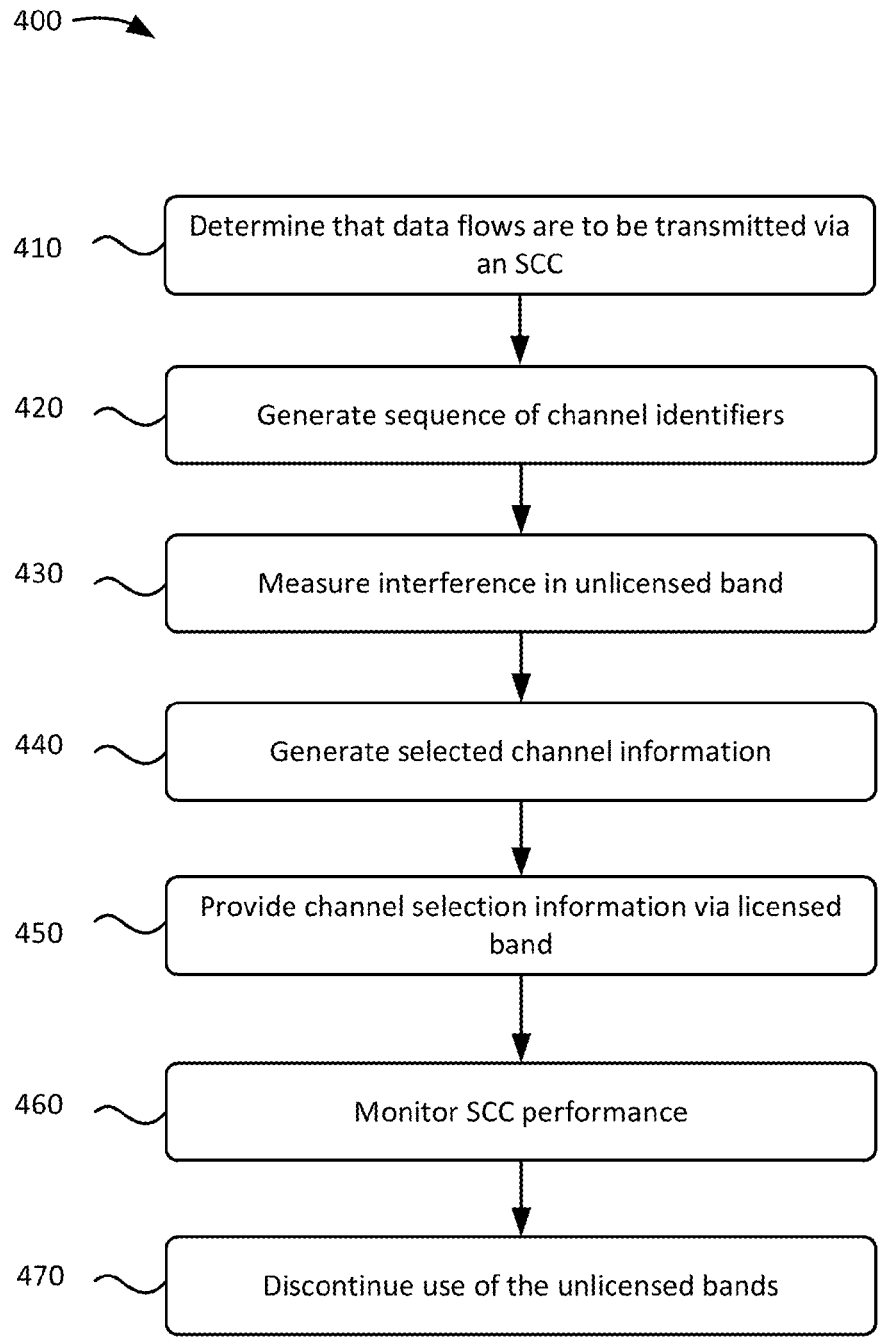
FIG. 4 illustrates a flowchart of an example process for assigning an unlicensed band for the transmission of data flows.

FIG. 4 illustrates a flowchart of an example process 400 for assigning unlicensed bands for the transmission of data flows. In some implementations, process 400 may be performed by one or more components of base station 220. In some implementations, some or all of blocks of process 400 may be performed by one or more components of another device in environment 200 (e.g., user device 210), or a group of devices including or excluding base station 220.

As shown in FIG. 4, process 400 may include determining that data flows are to be transmitted an SCC (block 410). For example, base station 220 may determine that data flows are to be transmitted via the SCC (e.g., unlicensed bands are to be dynamically assigned) when bandwidth measurements (e.g., data rates, latency, jitter, etc.) for user device 210 are below a particular threshold. As an example, base station 220 may determine that data flows are to be transmitted via the SCC when bandwidth measurements drop below a threshold corresponding to a minimum bandwidth that user device 210 is to receive (e.g., in accordance with a service level agreement or subscription identifying the minimum bandwidth). Additionally, or alternatively, base station 220 may determine that data flows are to be transmitted via the SCC in order to supplement bandwidth provided by the licensed band and to increase the bandwidth available to user device 210. Additionally, or alternatively, base station 220 may determine that data flows are to be transmitted via the SCC based on identifying that user device 210 is capable of transmitting and/or receiving data flows via licensed and unlicensed bands.

Process 400 may also include generating a sequence of channel identifiers (block 420). For example, base station 220 may generate a sequence of channel identifiers using sequence generator 310 as described above. In some implementations, base station 220 may generate a sequence including channel identifiers within a range of the number of channels (e.g., the number of unlicensed bands) included in an unlicensed spectrum. As described above, base station 220 may sub-divide the unlicensed spectrum into a number of unlicensed bands, and assign a channel number to each unlicensed band. In some implementations, the sequence may be randomly generated using a pseudorandom number generator and/or some other type of number generator. In one implementation, the sequence may be generated as a random or pseudorandom sequence. For example, base station 220 may generate the sequence based on a seed value.

Process 400 may also include measuring interference in the unlicensed band (block 430). For example, base station 220 may measure interference or noise in the unlicensed band using band scanner 320 as described above. Base station 220 may measure band interference for each unlicensed band in the unlicensed spectrum. As an example, for an unlicensed band having the frequency range of 100 megahertz (MHz) to 250 MHz, base station 220 may measure the interference or noise included in the unlicensed band having the frequency range of 100 MHz to 250 MHz. Base station 220 may identify unlicensed bands whose measure of interference/noise exceeds a particular threshold, and may exclude these unlicensed bands from being assigned for data flow transmission.

Process 400 may further include generating selected channel information (block 440). For example, base station 220 may generate the selected channel information based on the sequence of channel identifiers and the unlicensed band interference information. In some implementations, base station 220 may select a series of channel identifiers (e.g., a channel selection sequence) in a manner that excludes those channels of the unlicensed band that include a measure of interference/noise that exceeds a particular threshold. The sequence of channel identifiers, included in the selected channel information, may correspond to unlicensed bands that are to be dynamically assigned for data flow transmission (e.g., on a per-packet basis). For example, the channels, identified in the selected channel information, may be switched on a per-packet basis.

In some implementations, the selected channel information may identify multiple sequences, for example, when multiple unlicensed bands may be used by user device 210 and base station 220 to communicate. That is, user device 210 and base station 220 may simultaneously communicate via a licensed band and multiple aggregated unlicensed bands. For example, the selected channel information may include multiple sequences, where each sequence identifies a sequence of unlicensed bands via which user device 210 and base station 220 may communicate. As an example, when the selected channel information includes two sequences, user device 210 and base station 220 may communicate via an unlicensed band identified in a first sequence, and an unlicensed band identified in a second sequence.

In some implementations, multiple unlicensed bands may be selected for uplink and downlink transmissions. For example, a first sequence may identify unlicensed bands to be used for uplink transmission, and a second sequence may identify unlicensed bands to be used for downlink transmissions (e.g., in implementations using frequency-division duplexing (FDD)). In some implementations, a single carrier associated with a single unlicensed band may be used for both uplink and downlink transmission (e.g., in implementations using time-division duplexing (TDD) or in implementations using FDD where the secondary carrier may support either uplink or downlink transmission).

In some implementations, the channel selection information may include a seed value used to generate the sequence of channel identifiers (e.g., at block 420). In some implementations, the seed value may be provided to user device 210. The seed value may be input to an identical pseudo-random number generator, associated with user device 210, to deterministically generate the same channel sequence generated by base station 220.

Process 400 may also include providing channel selection information via the licensed band (450). For example, base station 220 may provide the channel selection information (e.g., information identifying the unlicensed band and the channel selection sequence) to user device 210 via the licensed band. Based on the selected channel information, user device 210 may use the unlicensed bands, identified in the selected channel information, to transmit and/or receive data flows to and/or from base station 220 via the unlicensed bands. In some implementations, transceiver component 340 may transmit and/or receive data to and/or from user device 210 via the unlicensed bands identified in the selected channel information. User device 210 and base station 220 may simultaneously communicate via the licensed and unlicensed bands.

In some implementations, user device 210 and base station 220 may dynamically switch bands based on the channel selection sequence included in the selection channel information. For example, user device 210 and base station 220 may dynamically switch bands based on a band hop schedule that identifies a band hop frequency (e.g., a 20 megahertz (MHz) hopping frequency, or some other hopping frequency). In some implementations, user device 210 and/or base station 220 may receive the band hop schedule from an operator of base station 220. The frequency at which unlicensed channels are to be dynamically changed and/or assigned may be based on balancing the likelihood of transmission errors against processing requirements. For example, a relatively greater frequency may reduce transmission errors since a greater frequency of channel assignment changes may reduce the number of packets assigned to a particular unlicensed channel. A relatively lower frequency may reduce the amount of processing needed to change the assignment the unlicensed bands.

Process 400 may also include monitoring the performance of the SCC (block 460). For example, base station 220 may monitor bandwidth measurements and/or error rates of data flows transmitted via the various channels used in the unlicensed band. In some implementations, base station 220 may provide test packets via the unlicensed band, and identify the bit rate, latency, jitter, and/or some other bandwidth measurement associated with the transmission of the test packets. Additionally, or alternatively, base station 220 may monitor the performance of the unlicensed bands using the some other technique.

At some point, process 400 may further include discontinuing use of the unlicensed bands (block 470). For example, base station 220 may discontinue use of the unlicensed band when a measure of the performance drops below a particular threshold. In some implementations, the performance may drop below the particular threshold based on the presence of interference in the channels of the unlicensed band. Additionally, or alternatively, the performance may drop below the particular threshold based on some other condition. Based on discontinuing the use of the unlicensed bands, base station 220 may discontinue the assignment of the unlicensed bands, and transmit and/or receive data flows to and/or from user device 210 via the PCC (e.g., licensed bands).

Figure 5A:
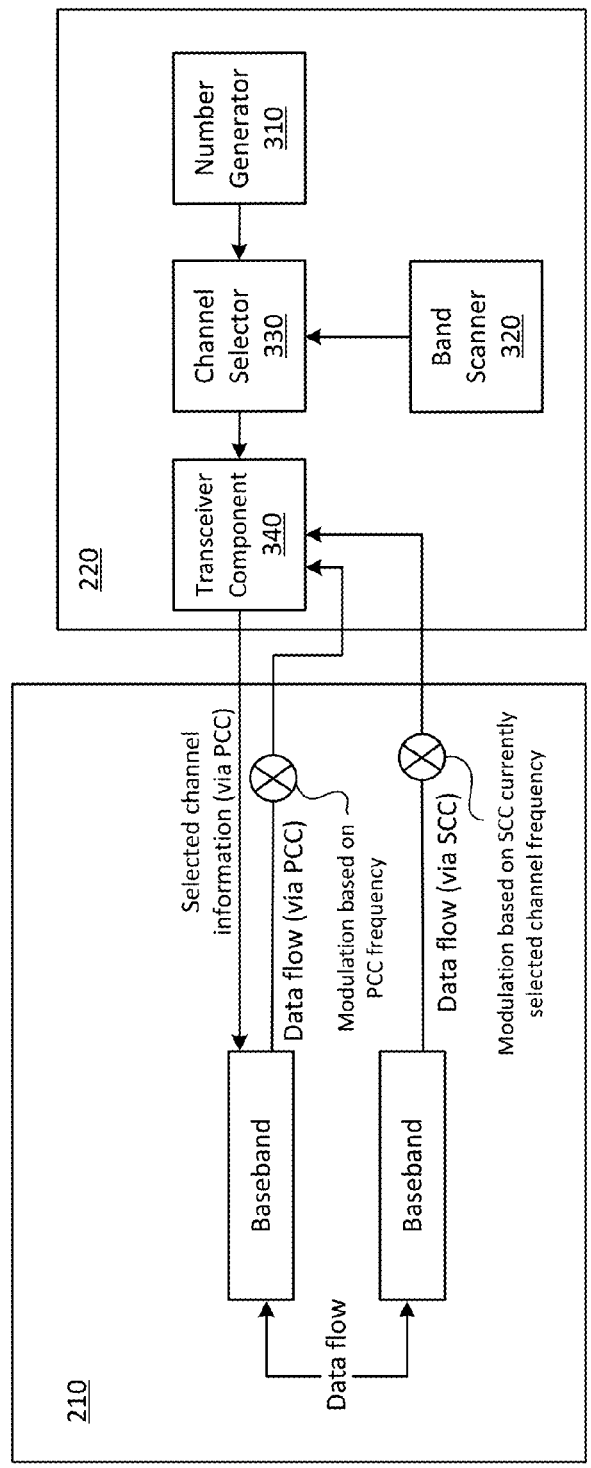
FIGS. 5A and 5B illustrate example implementations for transmitting and receiving data flows via licensed and unlicensed bands.
Figure 5B:
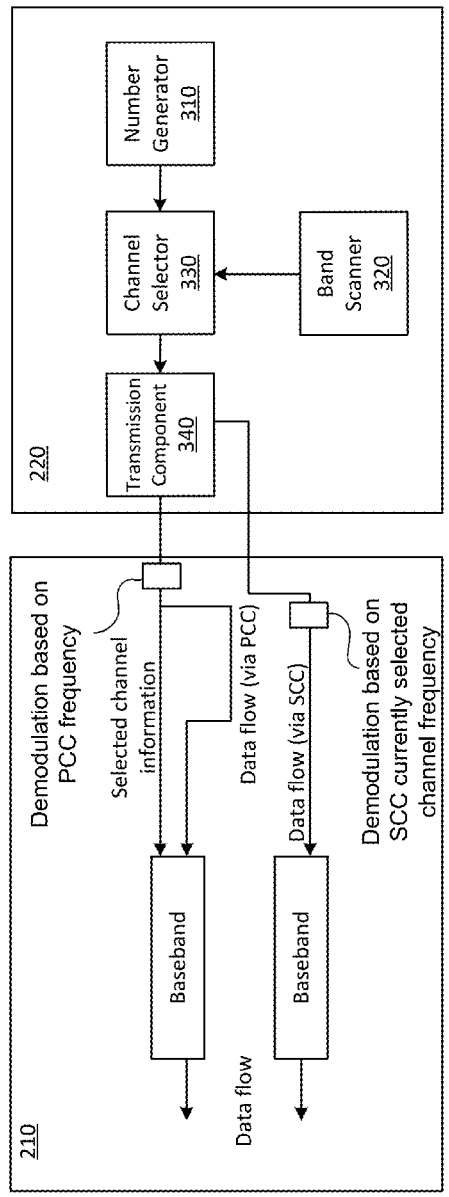

FIGS. 5A-5B illustrate example implementations for transmitting and receiving data flows via licensed and unlicensed bands. In FIG. 5A, assume that user device 210 functions as a transmitter to transmit data flows via base station 220. Further, assume that transceiver component 340 has received selected channel information from channel selector 330 as described above. Given this assumption, transceiver component 340 may receive data flows from user device 210 via the licensed and unlicensed bands. As shown in FIG. 5A, transceiver component 340 may provide the selected channel information to user device 210 via a licensed band over the PCC band. User device 210 may receive the selected channel information, isolate information identifying the unlicensed band, and begin to transmit and/or receive data flows via the unlicensed band. In some implementations, packets in the data flows may be redundantly transmitted via the PCC and SCC bands. Alternatively, packets in the data flow may be alternated between the PCC and SCC bands for transmission. As shown in FIG. 5A, the data flows may be modulated based on the PCC and the currently selected SCC frequencies. The data flows may be demodulated when received by transceiver component 340. Also, the selected channel information may be demodulated by user device 210 based on the PCC frequency.

Referring to FIG. 5B, assume that user device 210 functions as a receiver to receive data flows from base station 220. Further, assume that transceiver component 340 has received selected channel information from channel selector 330 as described above. Given this assumption, transceiver component 340 may begin to transmit and/or receive data flows via unlicensed bands identified in the selected channel information. As shown in FIG. 5B, transceiver component 340 may provide the selected channel information to user device 210 via a licensed band. User device 210 may receive the selected channel information, isolate information identifying the unlicensed band (e.g., based on a toggle sequence, a header, or the like, included in the selected channel information), and begin to transmit and/or receive data flows via the unlicensed band. As shown in FIG. 5B, the data flows and the selected channel information may be demodulated based on the PCC and the currently selected SCC frequencies.

Figure 6:
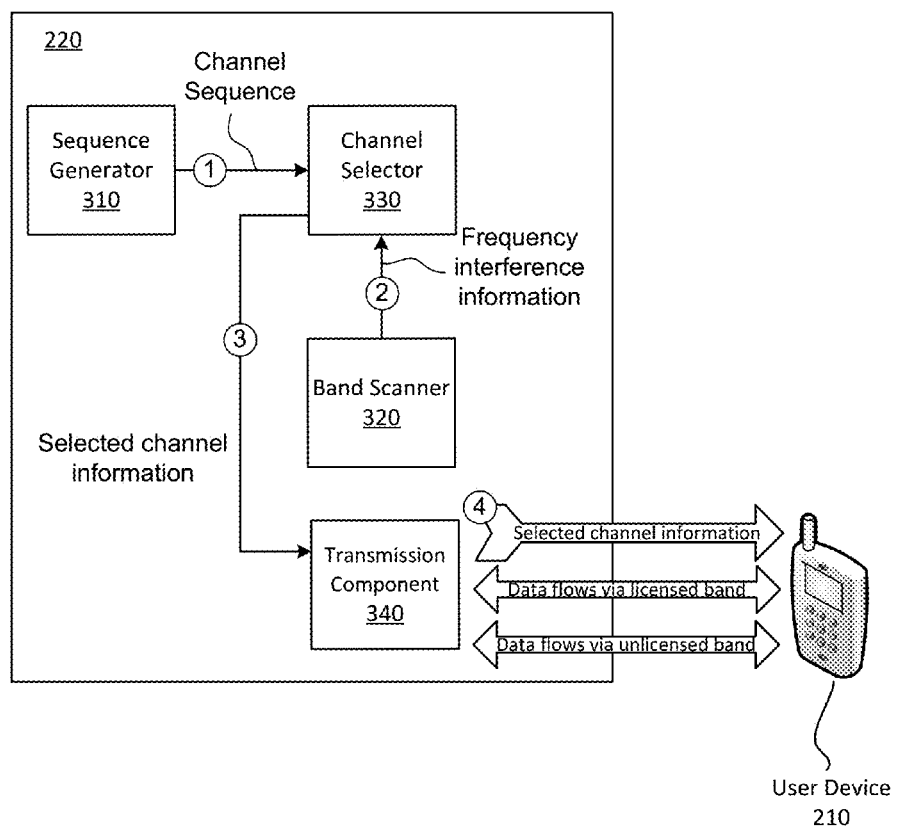
FIG. 6 illustrates an example implementation for transmitting data flows via licensed and unlicensed bands.

FIG. 6 illustrates an example implementation for transmitting data flows via licensed and unlicensed bands. In FIG. 6, assume that user device 210 connects with base station 220 via a licensed band. Further, assume that base station 220 identifies that user device 210 and base station 220 are to transmit and/or receive data flows via licensed and unlicensed bands. For example, as described above, base station 220 may identify that unlicensed bands are to be used to transmit and/or receive data flows when user device 210 is capable of transmitting and/or receiving data flows via multiple bands (e.g., licensed and unlicensed bands). Additionally, or alternatively, base station 220 may identify that unlicensed bands are to be used to transmit and/or receive data flows when bandwidth measurements (e.g., data rates, latency, jitter, etc.) for user device 210 are below a particular threshold (e.g., a threshold in accordance with a service level agreement or subscription identifying minimum bandwidth that user device 210 is to receive). Additionally, or alternatively, base station 220 may identify that unlicensed bands are to be used to transmit and/or receive data flows based on some other technique or parameter.

Based on determining that unlicensed bands are to be used to transmit and/or receive data flows, base station 220 may generate a number (e.g., using sequence generator 310), such as a channel number identifying an unlicensed band (arrow 1). Base station 220 may further determine frequency interference information (e.g., using band selector 320 as shown at arrow 2). Based on the frequency interference information and the channel number generated by sequence generator 310, base station 220 may select a channel (e.g., using 330) and provide selected channel information to user device 210 via transceiver component 340 and the licensed band (arrows 3 and 4). User device 210 may then transmit and/or receive data flows using the licensed and unlicensed bands. Further, base station 220 may transmit and/or receive data flows via the licensed and unlicensed bands. As described above, base station 220 may periodically provide updated selected channel information to cause user device 210 to transmit and/or receive data flows via the licensed and unlicensed bands.

While a particular example is shown in FIG. 6, it will be apparent that the above description is merely an example implementation. Other examples are possible and may differ from what was described with regard to FIG. 6.

Figure 7A:
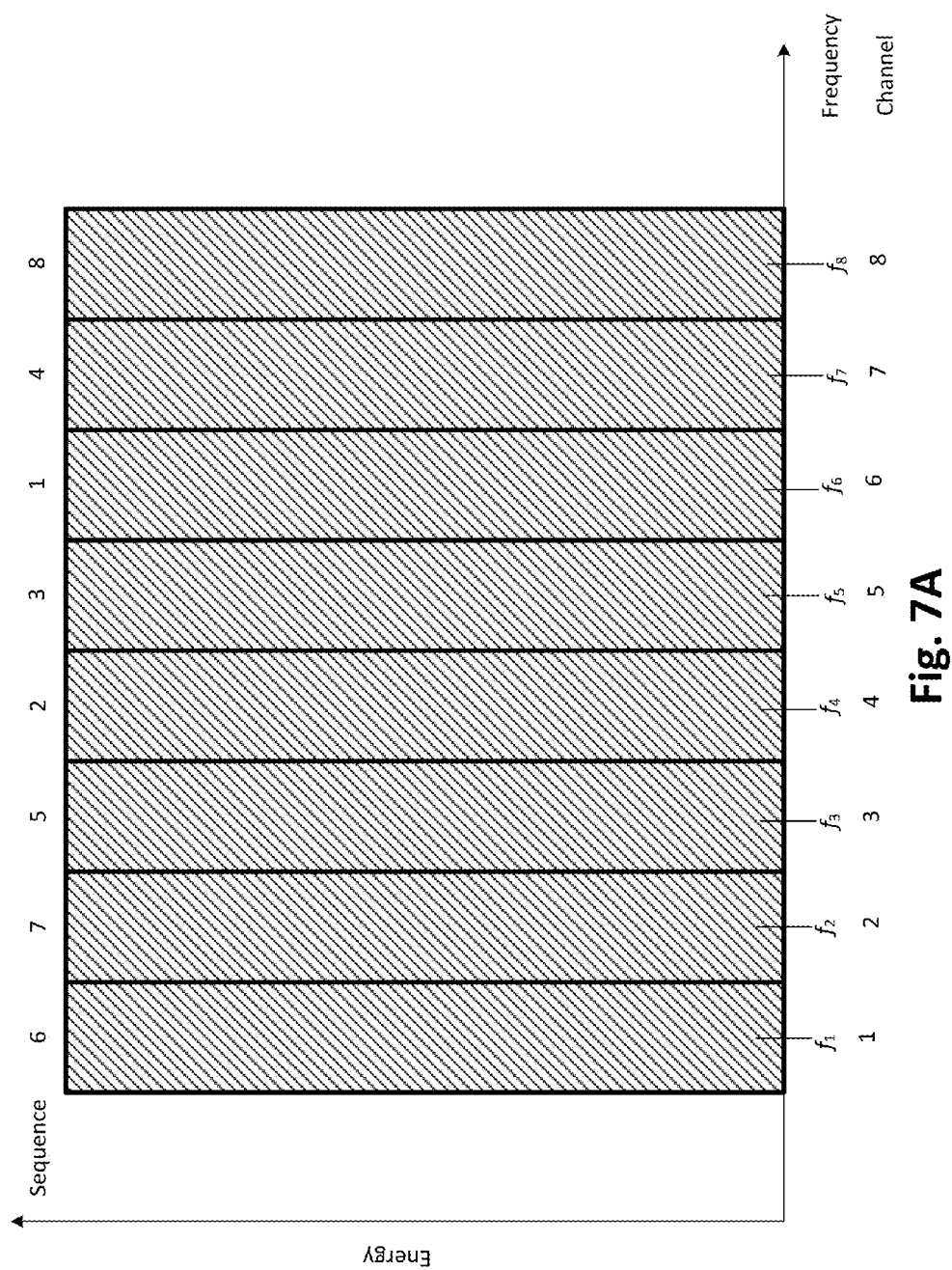
FIG. 7A illustrates a graph of an example unlicensed spectrum divided into possible channels.

FIG. 7A illustrates a graph of an example unlicensed spectrum divided into possible channels. As shown in FIG. 7A, eight bands in the unlicensed spectrum (e.g., corresponding to frequencies $f_1$ through $f_8$), maybe divided into unlicensed bands. The unlicensed bands may be identified by channel identifiers, such as channel identifiers 1 through 8 corresponding to $f_1$ through $f_8$. An example sequence, provided by channel selector 330, is further shown. In some implementations, base station 220 may receive information from an operator that identifies the division of the unlicensed spectrum and the associated channel identifiers. In some implementations, the division of the unlicensed spectrum into the channels may be based on code division multiplexing (CDM), orthogonal frequency division multiplexing (OFDM), frequency division multiplexing (FDM), time division multiplexing (TDM), and/or some other technique.

Figure 7B:
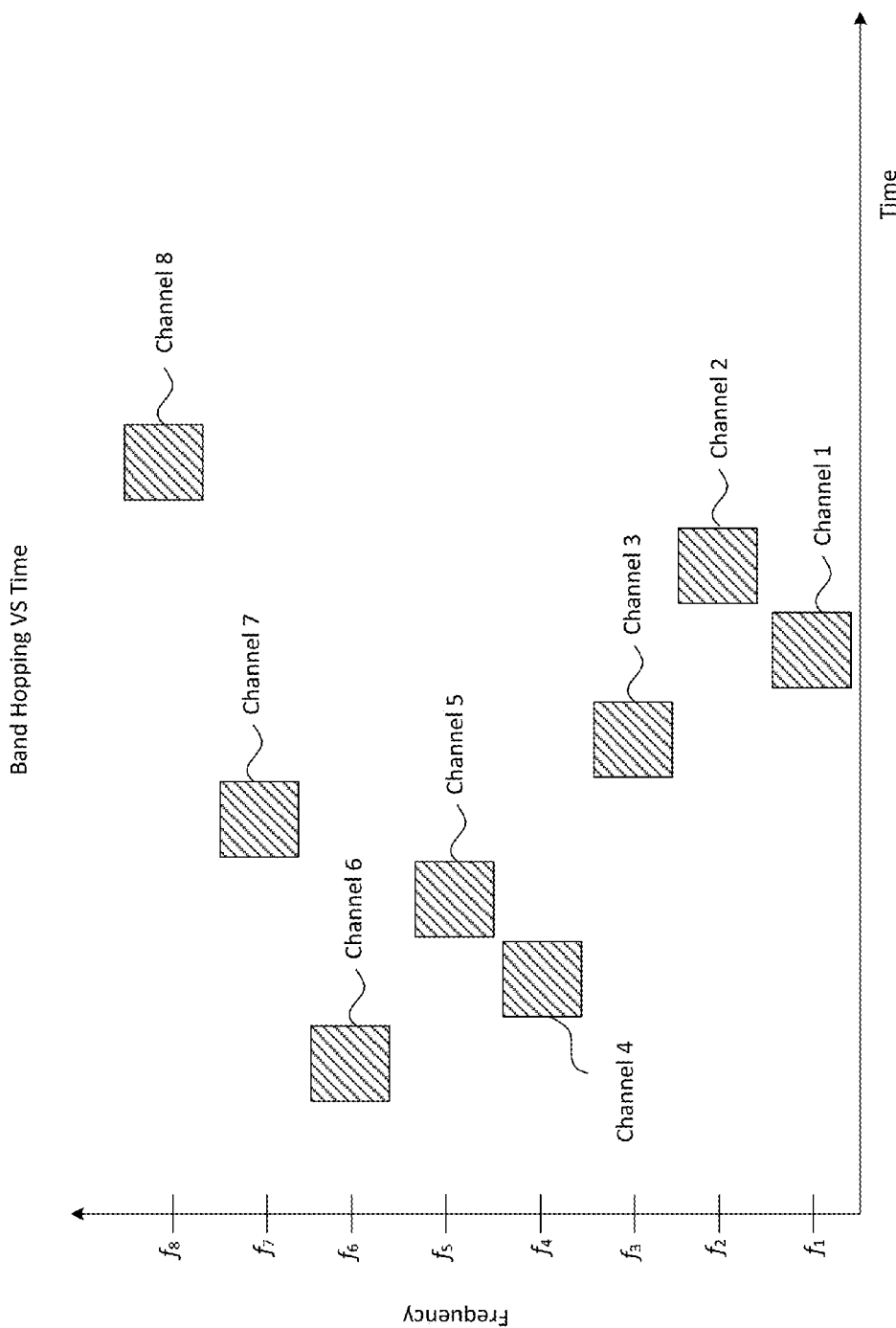
FIG. 7B illustrates a graph of example unlicensed band assignments over time.

FIG. 7B illustrates a graph of example unlicensed band assignments over time. As shown in FIG. 7B, unlicensed bands may be dynamically assigned for data flow transmission over time. The assignment of the unlicensed bands may be based on channels selected by base station 220. For example, the assignment of the unlicensed bands, shown in FIG. 7B, may correspond to channel selections made by channel selector 330 (e.g., based on channel numbers provided by sequence generator 310 and frequency interference information provided by band selector 320). The change in unlicensed band assignments over time, shown in FIG. 7B, may be based on a band hop schedule that identifies a frequency at which the unlicensed band assignments are to change. As described above, a relatively greater frequency may reduce the likelihood of transmission errors, since a greater frequency of band assignment changes may reduce the number of packets assigned to a particular unlicensed band. A relatively lower frequency may reduce the amount of processing needed to change the assignment the unlicensed bands.

User device 210 may transmit and/or receive data flows via the assigned unlicensed bands. In accordance with the example shown in FIG. 7B, user device 210 may transmit and/or receive data flows via a first unlicensed band during a first time period. In accordance with a band hop schedule, user device 210 may discontinue transmitting and/or receiving data flows via the first unlicensed band, and may begin transmitting and/or receiving data flows via a second unlicensed band. Similarly, user device 210 may transmit and/or receive data flows via dynamically assigned unlicensed bands identified in selected channel information received via a PCC.

While particular examples are shown in FIGS. 7A and 7B, it will be apparent that the above description is merely an example implementation. Other examples are possible and may differ from what was described with regard to FIGS. 7A and 7B.

Figure 8:
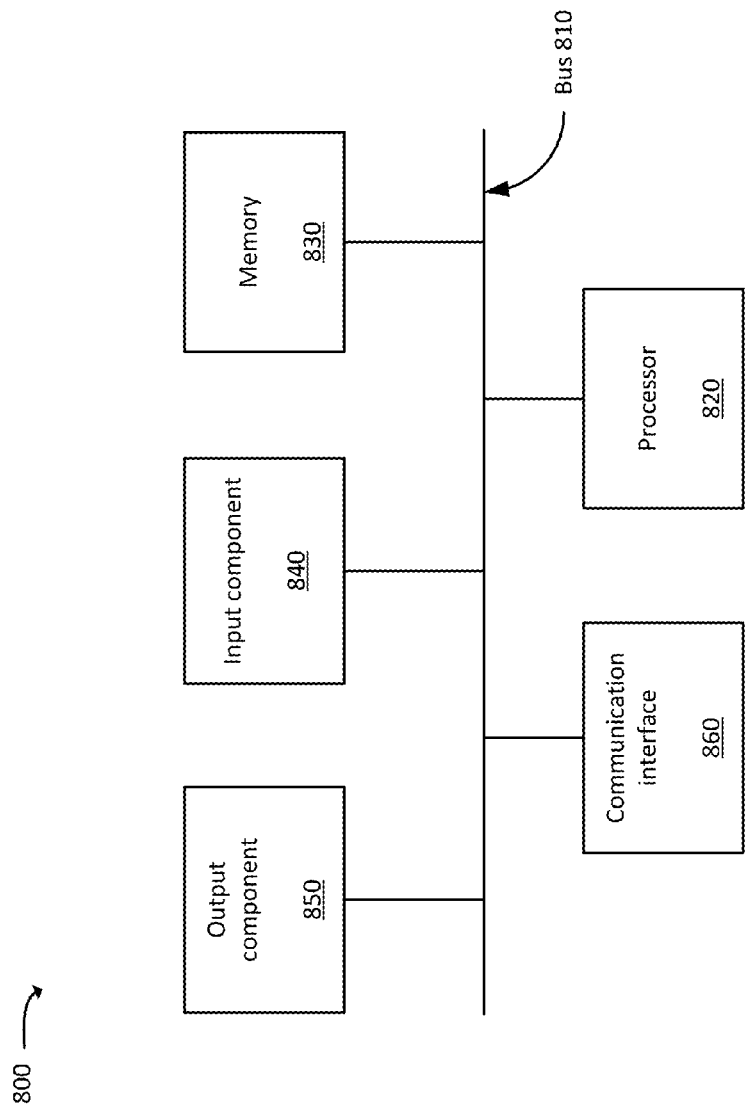
FIG. 8 illustrates example components of a device.

FIG. 8 is a diagram of example components of device 800. One or more of the devices described above (e.g., with respect to FIGS. 1-3, 5A, 5B, and 6) may include one or more devices 800. Device 800 may include bus 810, processor 820, memory 830, input component 840, output component 850, and communication interface 860. In another implementation, device 800 may include additional, fewer, different, or differently arranged components.

Bus 810 may include one or more communication paths that permit communication among the components of device 800. Processor 820 may include a processor, microprocessor, or processing logic that may interpret and execute instructions. Memory 830 may include any type of dynamic storage device that may store information and instructions for execution by processor 820, and/or any type of non-volatile storage device that may store information for use by processor 820.

Input component 840 may include a mechanism that permits an operator to input information to device 800, such as a keyboard, a keypad, a button, a switch, etc. Output component 850 may include a mechanism that outputs information to the operator, such as a display, a speaker, one or more light emitting diodes ("LEDs"), etc.

Communication interface 860 may include any transceiver-like mechanism that enables device 800 to communicate with other devices and/or systems. For example, communication interface 860 may include an Ethernet interface, an optical interface, a coaxial interface, or the like. Communication interface 860 may include a wireless communication device, such as an infrared ("IR") receiver, a Bluetooth® radio (Bluetooth is a registered trademark of Bluetooth SIG, Inc.), radio, or the like. The wireless communication device may be coupled to an external device, such as a remote control, a wireless keyboard, a mobile telephone, etc. In some embodiments, device 800 may include more than one communication interface 860. For instance, device 800 may include an optical interface and an Ethernet interface.

Device 800 may perform certain operations relating to one or more processes described above. Device 800 may perform these operations in response to processor 820 executing software instructions stored in a computer-readable medium, such as memory 830. A computer-readable medium may be defined as a non-transitory memory device. A memory device may include space within a single physical memory device or spread across multiple physical memory devices. The software instructions may be read into memory 830 from another computer-readable medium or from another device. The software instructions stored in memory 830 may cause processor 820 to perform processes described herein. Alternatively, hardwired circuitry may be used in place of or in combination with software instructions to implement processes described herein. Thus, implementations described herein are not limited to any specific combination of hardware circuitry and software.

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Some implementations are described herein in conjunction with thresholds. The term "greater than" (or similar terms), as used herein to describe a relationship of a value to a threshold, may be used interchangeably with the terra "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A method comprising:
   measuring, by a network device, interferences associated with a plurality of unlicensed bands in an unlicensed spectrum;
   selecting, by the network device, particular unlicensed bands, of the plurality of unlicensed bands, as those of the unlicensed bands that are below a particular threshold level of measured interference;
   determining, by the network device, a sequence, that identifies an order in which the selected particular unlicensed bands, of the plurality of unlicensed bands in the unlicensed spectrum, are to be assigned for communication of a data flow between a user device and the network device;
   providing, by the network device, the sequence, via a licensed band, to a user device to cause the user device to transmit the data flow using the particular unlicensed bands in the order identified by the sequence; and
   receiving, by the network device and from the user device, the data flow via the licensed band and the particular unlicensed bands, wherein the network device receives packets of the data flow, over the unlicensed bands, based on switching reception between the unlicensed bands, in the order identified in the sequence and wherein the switching is performed on a per-packet basis.

2. The method of claim 1, further comprising:
   storing a plurality of channel identifiers,
      each of the plurality of channel identifiers identifying a particular unlicensed band,
      wherein determining the sequence includes determining a sequence of the channel identifiers.

3. The method of claim 2, wherein the sequence of the channel identifiers is determined using a pseudorandom number generator.

4. The method of claim 3,
   wherein the sequence is provided to the user device as a seed value for the pseudorandom number generator.

5. The method of claim 1, further comprising:
   determining that the user device is to transmit the data flow via the particular unlicensed bands based on a bandwidth measurement associated with the user device,
   wherein determining the sequence is based on determining that the user device is to transmit the data flow via the particular unlicensed bands.

6. The method of claim 1, further comprising:
   monitoring a measure of performance of the transmission of the data flow via the particular unlicensed bands; and
   discontinuing transmission of the data flow via one or more of the particular unlicensed bands when the measure of performance satisfies a particular threshold.

7. The method of claim 1, wherein the data flow is simultaneously received via multiple unlicensed bands and wherein the determined sequence corresponds to a corresponding plurality of sequences.

8. A system comprising:
a network device to:
measure interferences associated with a plurality of unlicensed bands in an unlicensed spectrum;
select particular unlicensed bands, of the plurality of unlicensed bands, as those of the unlicensed bands that are below a particular threshold level of measured interference;
determine a sequence,
the sequence identifying an order in which the selected particular unlicensed bands, of the plurality of unlicensed bands in the unlicensed spectrum, are to be assigned for communication of a data flow between a user device and the network device;
provide the sequence, via a licensed band to the user device to cause the user device to transmit the data flow using the particular unlicensed bands in the order identified by the sequence; and
receive, from the user device, the data flow via the licensed band and the particular unlicensed bands, wherein the network device receives packets of the data flow, over the unlicensed bands, based on switching reception between the unlicensed bands, in the order identified in the sequence and wherein the switching is performed on a per-packet basis.

9. The system of claim 8, wherein the network device is further to:
store a plurality of channel identifiers,
each of the plurality of channel identifiers identifying a particular unlicensed band,
wherein when determining the sequence, the network device is further to determine a sequence of the channel identifiers.

10. The system of claim 9, wherein the sequence of the channel identifiers is determined using a pseudorandom number generator.

11. The system of claim 10,
wherein the sequence is provided to the user device as a seed value for the pseudorandom number generator.

12. The system of claim 8, wherein the network device is further to:
determine that the user device is to transmit the data flow via the particular unlicensed bands based on a bandwidth measurement associated with the user device,
wherein when determining the sequence, the network device is to determine the sequence based on determining that the user device is to transmit the data flow via the particular unlicensed bands.

13. The system of claim 8, wherein the network device is further to:
monitor a measure of performance of the transmission of the data flow via the particular unlicensed bands; and
discontinue transmission of the data flow via one or more of the particular unlicensed bands when the measure of performance satisfies a particular threshold.

14. The system of claim 8, wherein the data flow is simultaneously received via multiple unlicensed bands and wherein the determined sequence corresponds to a corresponding plurality of sequences.

15. A method comprising:
receiving, by a user device and via a licensed band, information identifying a sequence,
the sequence identifying an order in which particular unlicensed bands, of a plurality of unlicensed bands in an unlicensed spectrum, are to be assigned for the transmission of a data flow associated with a plurality of packets,
the particular unlicensed bands having been selected, by a network device, as those of the plurality of unlicensed bands that are below a particular threshold level of measured interference;
transmitting, by the user device, the plurality of the packets of the data flow by sequentially using, on a per-packet basis of the plurality of packets, different ones of the particular unlicensed bands, wherein the order of sequentially using the different ones of the particular unlicensed bands corresponds to the order identified by the sequence.

16. The method of claim 15, wherein transmitting the data flow includes transmitting the data flow via a first unlicensed band, of the particular unlicensed bands, for a first packet of the plurality of packets, and a second unlicensed band, of the particular unlicensed bands, for a second packet of the plurality of packets.

17. The method of claim 15, further comprising:
providing measures of performance of the transmission of the data flow via the particular unlicensed band; and
discontinuing transmission of the data flow via the particular unlicensed bands when the measure of performance satisfies a particular threshold.

18. The method of claim 15, wherein transmitting the data flow includes transmitting the data flow via a first unlicensed band, of the particular unlicensed bands, for a first packet of the plurality of packets, and a second unlicensed band, of the particular unlicensed bands, for a second packet of the plurality of packets.

19. The method of claim 15, further comprising:
providing measures of performance of the transmission of the data flow via the particular unlicensed band; and
discontinuing transmission of the data flow via the particular unlicensed bands when the measure of performance satisfies a particular threshold.

20. The method of claim 15, wherein the information identifying the sequence includes a seed value for pseudorandom generation of the sequence.

* * * * *